United States Patent
Li et al.

(10) Patent No.: US 10,601,725 B2
(45) Date of Patent: Mar. 24, 2020

(54) SLA-BASED AGILE RESOURCE PROVISIONING IN DISAGGREGATED COMPUTING SYSTEMS

(71) Applicant: INTERNATIONAL BUSINESS MACHINES CORPORATION, Armonk, NY (US)

(72) Inventors: Min Li, San Jose, CA (US); John A. Bivens, Ossining, NY (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 165 days.

(21) Appl. No.: 15/155,517

(22) Filed: May 16, 2016

(65) Prior Publication Data
US 2017/0331759 A1    Nov. 16, 2017

(51) Int. Cl.
*H04L 12/911* (2013.01)
*H04L 29/08* (2006.01)
*H04L 12/24* (2006.01)

(52) U.S. Cl.
CPC .......... *H04L 47/70* (2013.01); *H04L 41/5022* (2013.01); *H04L 41/5054* (2013.01); *H04L 67/10* (2013.01); *H04L 41/5051* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 9,386,086 B2 * | 7/2016 | Fenoglio | G06F 9/505 |
| 9,450,838 B2 * | 9/2016 | Jain | G06F 9/5072 |
| 2005/0015430 A1 * | 1/2005 | Rothman | G06F 9/4405 709/201 |
| 2005/0071182 A1 * | 3/2005 | Aikens | G06Q 10/00 705/500 |
| 2009/0019137 A1 * | 1/2009 | Mishra | G06Q 10/00 709/220 |
| 2011/0173038 A1 * | 7/2011 | Moon | G06F 9/5072 705/7.12 |
| 2012/0166517 A1 | 6/2012 | Lee et al. | |
| 2012/0311135 A1 * | 12/2012 | DeLuca | G06F 9/44505 709/224 |
| 2013/0246109 A1 | 9/2013 | Jain et al. | |

(Continued)

*Primary Examiner* — Thomas J Dailey
(74) *Attorney, Agent, or Firm* — Griffiths & Seaton PLLC (57) ABSTRACT

Various embodiments for agile component-level resource provisioning in a disaggregated cloud computing environment, by a processor device, are provided. Respective members of pools of hardware resources within the disaggregated cloud computing environment are allocated to each respective one of a plurality of tenants according to one of a plurality of service level agreement (SLA) classes. Each respective one of the plurality of SLA classes is characterized by a given response time for the allocation of the respective members of the pools of hardware resources corresponding to a requested workload by the tenant.

18 Claims, 5 Drawing Sheets

(56) References Cited

U.S. PATENT DOCUMENTS

2013/0346493 A1 12/2013 Martin
2014/0136710 A1* 5/2014 Benari ................ G06F 9/5044
709/226

* cited by examiner

SLA-BASED AGILE RESOURCE PROVISIONING IN DISAGGREGATED COMPUTING SYSTEMS

BACKGROUND OF THE INVENTION

Field of the Invention

The present invention relates generally to large scale computing, and more particularly to pooling and dynamically distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects.

SUMMARY OF THE INVENTION

Various embodiments for agile component-level resource provisioning in a disaggregated cloud computing environment, by a processor device, are provided. Respective members of pools of hardware resources within the disaggregated cloud computing environment are allocated to each respective one of a plurality of tenants according to one of a plurality of service level agreement (SLA) classes. Each respective one of the plurality of SLA classes is characterized by a given response time for the allocation of the respective members of the pools of hardware resources corresponding to a requested workload by the tenant.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Computing resources are usually pre-configured by vendors at fixed levels of configurations. One aspect is that each individual computing resource, such as memory size, number of CPUs, disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, a VM cannot change its base resources, such as adding memory or adding virtual CPUs. This is because such a VM shares the hardware resources of a fixed pre-built server enclosure with other VMs, and it may not be possible to displace other users to make room for the resource expansion of the first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system, such that workloads are computed based on hardware resource configurations that are most suitable for the respective workload. In one embodiment, for example, a system may be constructed with an extremely high capability of memory size but with a more moderate capacity of CPU and other resources, for a memory-intensive workload.

Within these disaggregated systems, various application-level service level agreements (SLAs) may be employed to dynamically provision the hardware resources on-demand, and ensure that a tenant is receiving the computing service they have purchased, while retaining an overall cost and performance efficiency model for both the cloud service provider and the tenant.

Figure 1:
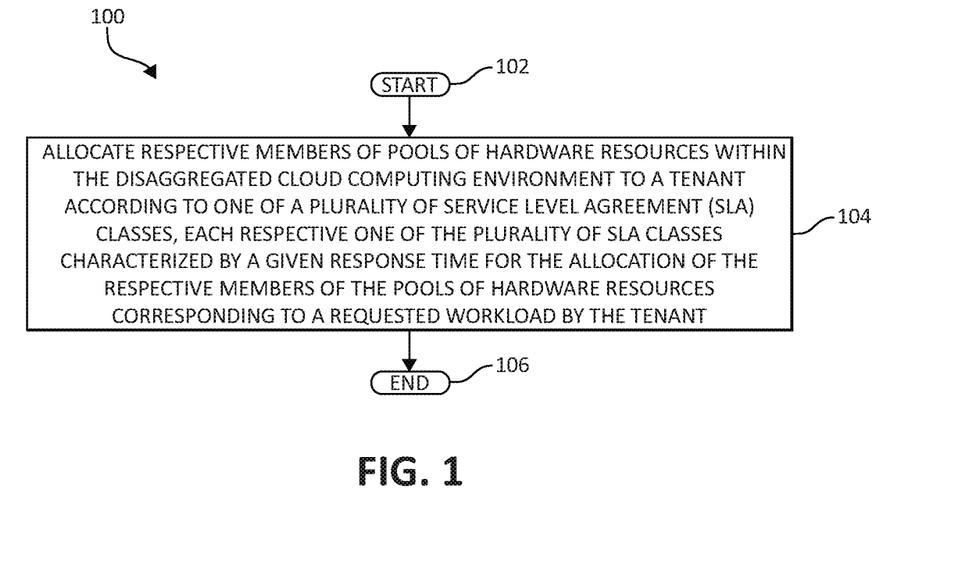
FIG. 1 is a flow chart diagram illustrating a method for provisioning resources in a disaggregated cloud computing environment in accordance with various aspects of the present invention.

FIG. 1 illustrates a method 100 for provisioning resources in a disaggregated cloud computing environment, in accordance with one embodiment of the present invention. The method 100 may be performed in accordance with the present invention in any of the environments depicted in FIGS. 2 and 3 described infra, among others, in various embodiments. Of course, more or less operations than those specifically described in FIG. 1 may be included in method 100, as would be understood by one of skill in the art upon reading the present descriptions.

Each of the steps of the method 100 may be performed by any suitable component of the operating environment. For example, in various embodiments, the method 100 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 100. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

Beginning (step 102), respective members of a pool of hardware resources within the disaggregated cloud computing environment are allocated to each respective one of a plurality of tenants according to one of a plurality of service level agreement (SLA) classes. Each respective one of the plurality of SLA classes is characterized by a given response time for the allocation of the respective members of the pools of hardware resources corresponding to a requested workload by the tenant (step 104). The method ends (step 106).

Figure 2:
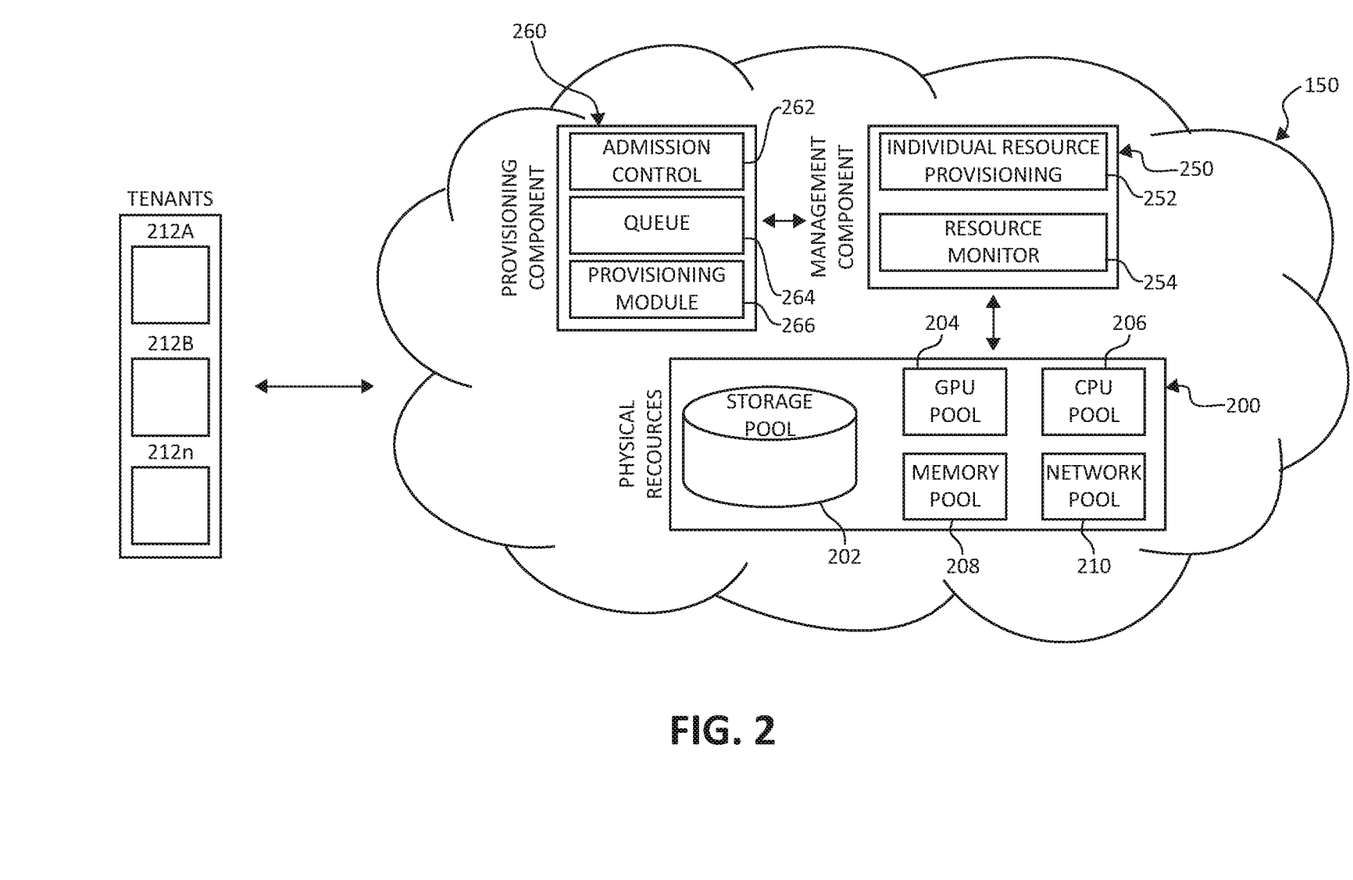
FIG. 2 is a block diagram showing a hardware structure of a disaggregated computing environment, in which aspects of the present invention may be realized.

Advancing to FIG. 2, a block diagram of a disaggregated computing environment is illustrated, including cloud environment 150. Within cloud environment 150 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254. The management module 250 is in communication with a provisioning component 260. The provisioning component 260 may include such systems as an admission control module 262, a service level queue 264, and a resource provisioning module 266, each described herein.

In communication with the cloud environment 150, the management module 250, the provisioning component 260, and the physical hardware resources 200, are tenants 212A, 212B, and 212n. Tenants 212A, 212B, and 212n may communicate with the cloud environment 150 by way of the provisioning component 260, the management module 250, and thus the physical resources 200 provided by any signal-bearing medium.

It should be noted that the elements illustrated in FIG. 2 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention. Additionally, the management module 250 and the provisioning component 260 may physically comprise of separate entities, or may be combined into one entity. Furthermore, the duties of the management module 250 and the provisioning component 260, and thus the components therein, may be performed and comprised of physical components, computer code, or a combination of such.

In one embodiment, the management module 250 and the provisioning component 260 interact with individual tenants to receive workload requests and locate the best suitable hardware resources for the given workload. Individual hardware resources are tracked and a mapping is maintained between each respective tenant and assigned hardware resource. Each hardware resource is identified using a unique identifier. This identifier may be a physical identifier (e.g. barcode) and/or a virtual identifier (e.g. code based). The management module 250, the provisioning component 260, a combination thereof, or any other suitable modules or means known in the art may be used to accomplish these mechanisms.

Figure 3:
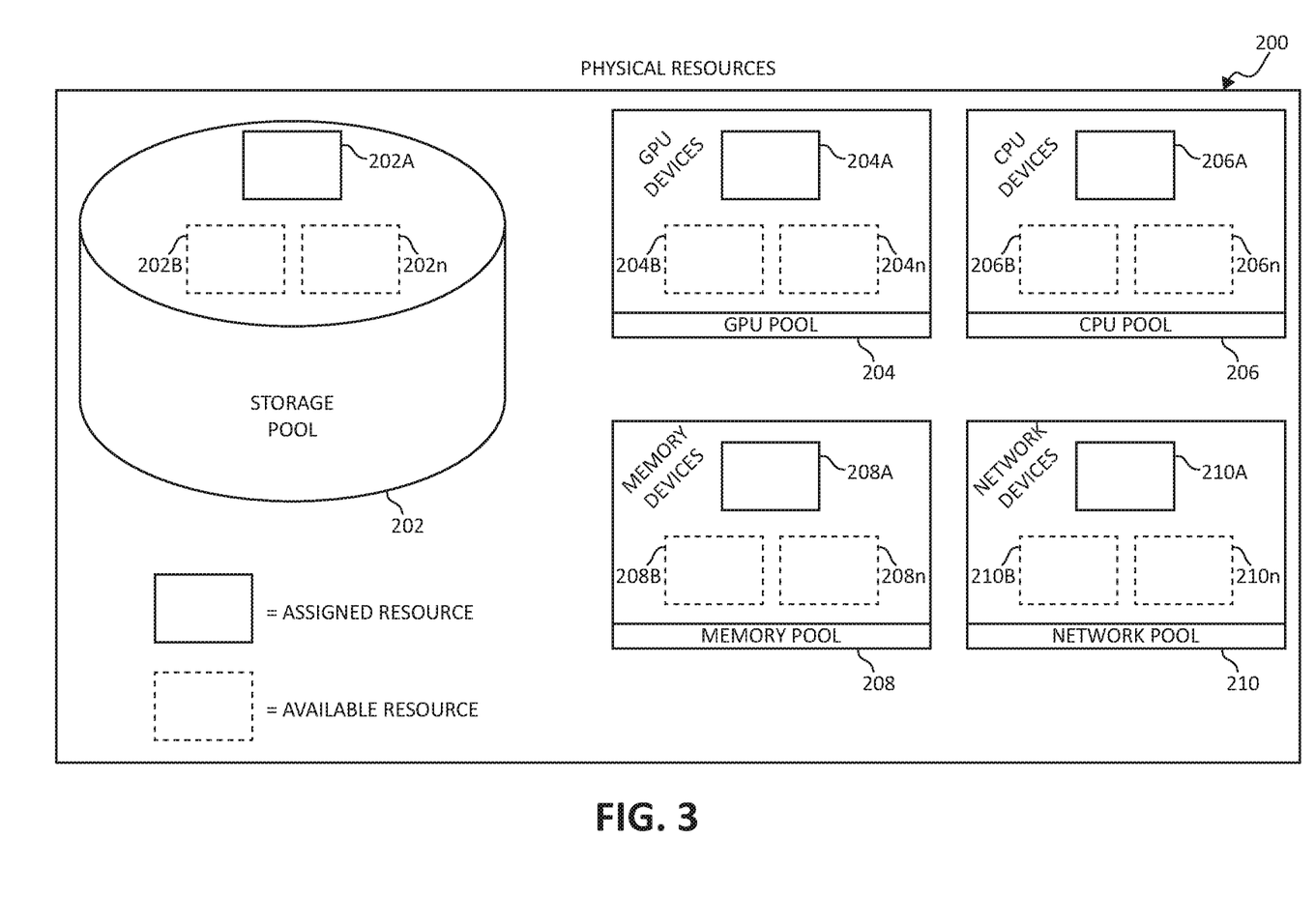
FIG. 3 is an additional block diagram showing a hardware structure of a disaggregated computing environment, in which aspects of the present invention may be realized.

FIG. 3 is a block diagram illustrating the physical hardware resources 200 portion of FIG. 2. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) is assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

Infrastucture-Level Service Level Agreements (SLAs)

In various embodiments, respective hardware resources 200 are provisioned to a respective tenant 212A-n according to an SLA. A hierarchy of SLA classes may be used to achieve agile, elastic resource provisioning and high resource utilization while guaranteeing an understood infrastructure level service quality to the respective tenant 212A-n. Moreover, the SLA classes provide dynamic auto-scaling capability while maintaining component-level granularity provisioning of infrastructure resources. Provided are the hierarchy of service class levels as follows:

First Class Service Level: The first class infrastructure-level SLA provides allocation of respective hardware resources 200 to a respective tenant 212A-n for a requested workload in real-time, generally on the order of milliseconds. The first class service level guarantees that scale-up requirements of the individual resources for a given workload are always satisfied.

Economy Class Service Level: The economy class infrastructure-level SLA provides allocation of respective hardware resources 200 to a respective tenant 212A-n for a requested workload in a predetermined first period of time. Generally speaking, resources are allocated promptly (e.g. 30-60 minutes), under the condition that all first class service level workload requests have been satisfied. Economy class service level workload requests provide statistical resource availability, such that workload requests may be queued for a later execution time in the event that new first class service level requests have been entered, while still providing allocation of resources to perform the workload within the first predetermined time period (e.g. 1 week).

Standby Class Service Level: The standby class infrastructure-level SLA provides no real-time allocation of respective hardware resources 200 to a respective tenant 212A-n for a requested workload, however guarantees to allocate resources within a second predetermined time period as to not starve the workload. For example, a guarantee may be provided to allocate 10 hours of computation within a week, where resources may be allocated at an available time anytime therein. Given that workload requests are not starved, a standby service class level workload request may be preempted whenever first class and economy class service level workload requests necessitate resources.

It is important to note that one skilled in the art would recognize that additional or fewer classes of SLAs may be incorporated into the present invention other than the first class, economy class, and standby class service levels, or may be referred to by different language. The aforementioned are merely to provide examples and should not be construed as limiting models while staying in spirit and scope of the invention. Additionally, the described plurality of SLA classes should not be construed to be "quality-of-service classes", but rather provide a given response time for allocation of the respective hardware resources 200 to the respective tenants 212A-n for performing a given workload upon request.

In various embodiments, upon the submission of a workload and specified SLA class by a respective tenant 212A-n, the admission control module 262 determines whether the disaggregated system can satisfy the SLA requirements of the selected SLA class based upon a current system status. The current system status may include availability of resources, a quantity of workload requests, and a quantity of SLA requests of the varying classes, among other examples. If it is determined that the resources necessary for the workload request at the specified SLA class level are not available, the respective tenant 212A-n is prompted to select an alternative service class level which would accommodate the workload request. The service level queue 264 then differentiates the resource requests based upon a specified one of the SLA classes and adds them in a hierarchal order to the workload queue. The resource provisioning module 266 retrieves a given workload request from the service level queue 264, and determines whether to provision the resources based upon the SLA class requirement, and ultimately determines to which workload requests to allocate the resources. An example of the provisioning APIs provided are as follows:

Allocate CPU and Memory Resources
SLAClass {First, Economy, Standby}
    resource vector {{numCPU/numGPU/numAccelerator, sizeMem}, numMachine, bandwidth}
    defineSLA(minResourceVector, maxResourceVector, SLAClass, minDuration, maxDuration)
    allocateResource(resourceVector, SLA)
Scale Up/Down CPU and Memory Resources based on SLA Class
    scaleResource(resouceVector, SLA)
Release Resources
releaseResource(resourceVector)

Figure 4:
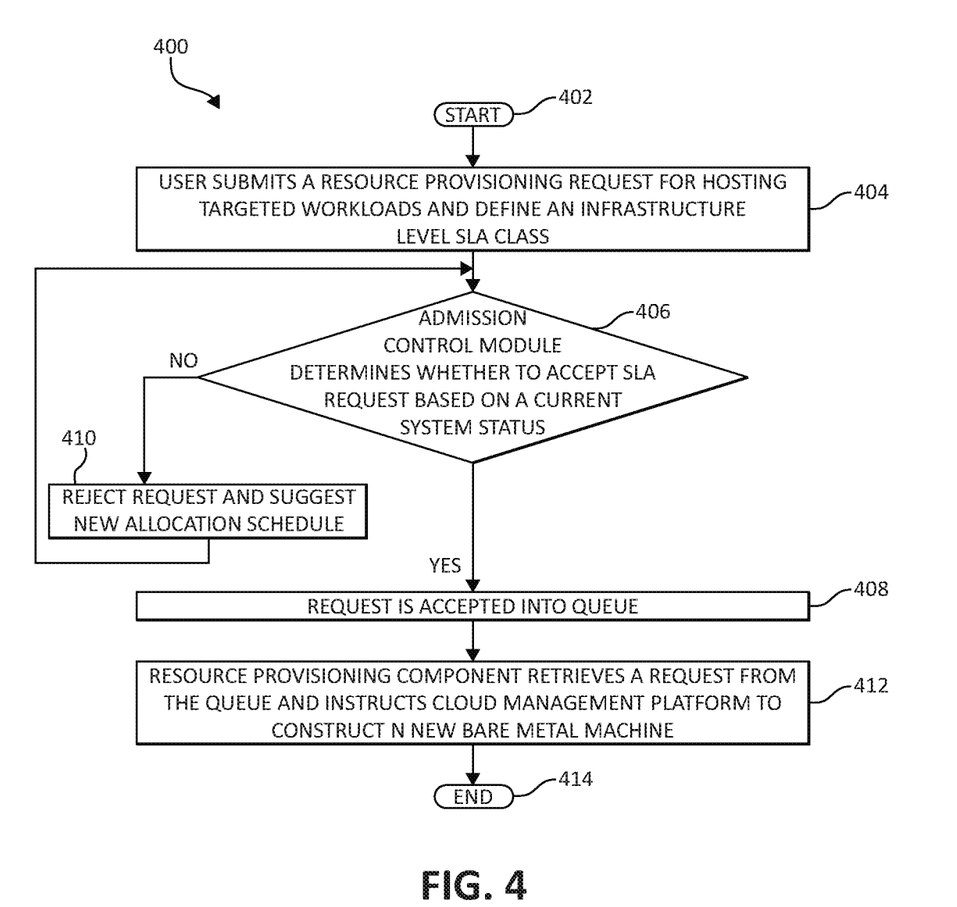
FIG. 4 is an additional flow chart diagram illustrating a method for agile component-level resource provisioning in a disaggregated cloud computing environment in accordance with various aspects of the present invention.

FIG. 4 illustrates a method 400 for provisioning resources in a disaggregated cloud computing environment. The method 400 may be performed in accordance with the present invention in any of the environments depicted in FIGS. 2 and 3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 400 begins (step 402) when a user (tenant) submits a resource provisioning request for hosting targeted workloads and defines a requested infrastructure level SLA class. (step 404). A determination is made by the admission control module 262 whether to accept SLA request based on a current system status (step 406). Here again, the current system status may comprise of availability of resources and a quantity of workload requests at their respective SLA class levels. If, at step 406, the admission control module 262 determines to accept the workload request at the specified SLA class level, the workload request is accepted into the service level queue 264 (step 408).

Otherwise, at step 406, the admission control module 262 determines the system is too busy to accept the workload request at the specified SLA class level, the workload request is rejected and the user (tenant) is prompted with an alternative SLA class level provided by the system which would provide the adequate resources and timeframe able to accommodate the request (step 410). Returning to step 408, once the workload request has been accepted into the service level queue 264, the resource provisioning module 266 retrieves a request from the service level queue 264, and instructs the management component 250 to construct and launch an n new bare metal machine with (numCPU/GPU/accelerator, numMemory) (step 412). If the request is a first class level workload request, and there are enough available resources for the given workload, the resources are allocated. If there are not enough available resources for the first class request, yet standby service level tasks remain, resources are preempted from the standby tasks in a round robin fashion to accommodate the first class service level request. Otherwise, resources from any remaining economy jobs are preempted to be allocated to the first class service level workload request in a round robin fashion. The method ends (step 414).

Admission Control Algorithm

Figure 5:
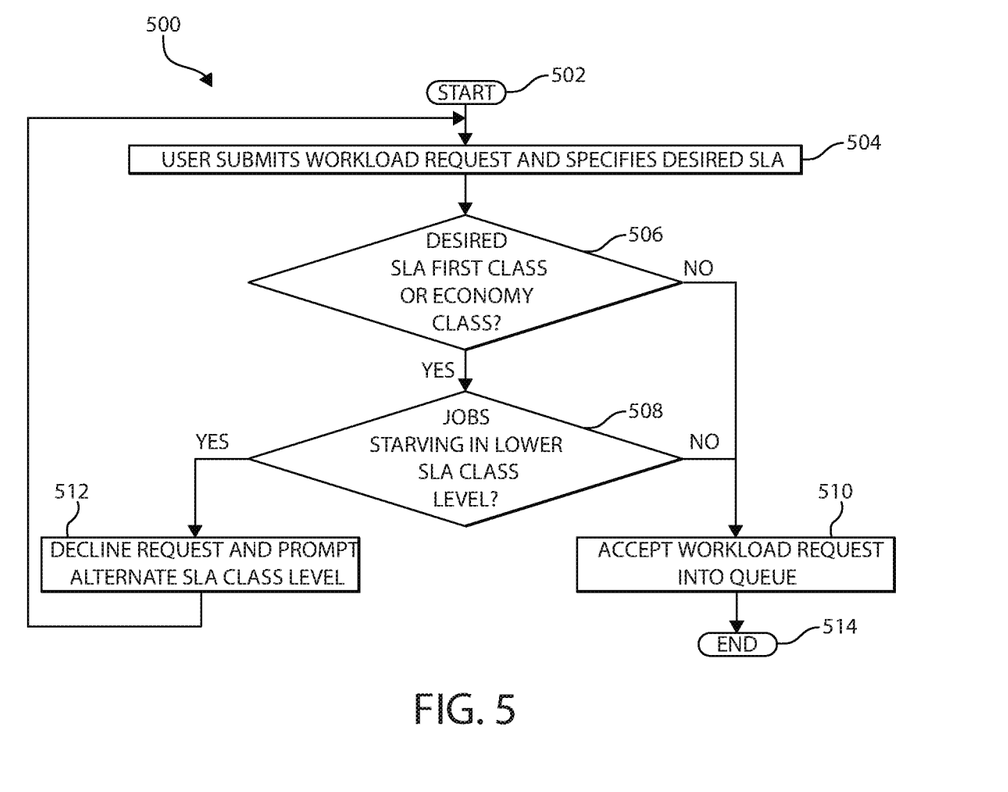
FIG. 5 is a flow chart diagram illustrating an admission control algorithm model for agile component-level resource provisioning in a disaggregated cloud computing environment in accordance with various aspects of the present invention.

FIG. 5 illustrates a method 500 for provisioning resources in a disaggregated cloud computing environment, in accordance with one embodiment of the present invention. The method 500 may be performed in accordance with the present invention in any of the environments depicted in FIGS. 2 and 3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 500 begins (step 502) when a user (tenant) submits a given workload request and specifies the particular SLA class level desired to perform the requested workload (step 504). A determination is made whether the requested workload is a first class level SLA or economy class level SLA request (step 506). If the desired SLA is not a first class level nor an economy class level request (thus meaning the requested workload is desired under a standby class level SLA), the workload request is accepted into the service level queue 264 (step 510), and the method ends (step 514).

Returning to step 506, if the requested workload is desired under a first class level or economy class level SLA, a check is performed to determine whether lower class level workloads are starving (having insufficient resources to perform the workload) in the queue (step 508). For first class service level requests, this means determining whether no standby class level and economy class level workloads are starving in the queue (if sum of resources of standby and economy class workloads and free resources−s.maxRes>0); and for economy class level requests, this means determining whether no standby class level workloads are starving in the queue (if sum of resources of standby class workloads+first class workloads with expected time<1 h+free resources−s.maxRes). If, at step 506, neither of the aforementioned conditions apply and there are no starving workloads existing in the queue, the first class service level or economy class service level workload request is accepted into the service level queue 264 (step 510), and the method ends (step 514).

Otherwise, at step 506, if either condition is not met for a first class service level or an economy class service level request, meaning that a lower class level workload is starving in the queue, the given workload request is declined and the user (tenant) is prompted with an alternate service class level option which may be able to accommodate the workload request (step 512), and the method 500 returns to the start (step 502).

As discussed above, the admission control algorithm is formulated as follows. Upon the submission of a user (tenant) SLA workload request S:

If S is a first class service level request, perform check to determine if no standby class level and economy class level workloads are starving in the queue (if sum of resources of standby and economy class workloads and free resources−s.maxRes>0), accept the request; otherwise, reject and prompt alternative service class.

If S is an economy class service level request, perform check to determine if no standby class level workloads are starving in the queue (if sum of resources of standby class workloads+first class workloads with expected time<1 h+free resources−s.maxRes), accept the request; otherwise, reject and prompt alternative service class.

If S is a standby class service level request, accept.

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for agile component-level resource provisioning in a disaggregated cloud computing environment, by a processor device, comprising:
    allocating respective members of pools of hardware resources within the disaggregated cloud computing environment to a tenant according to one of a plurality of service level agreement (SLA) classes, each respective one of the plurality of SLA classes characterized by a given response time for the allocation of the respective members of the pools of hardware resources corresponding to a requested workload by the tenant; wherein the respective members of the pools of hardware resources include at least processors, memory devices, graphical processing units (GPUs), and accelerators; and allocating the respective members of the pools of hardware resources on the component-level to the tenant comprises allocating, beginning at a minimal unit of allocation, individual portions of individual ones of the processors, the memory devices, the GPUs, and the accelerators to the tenant; and
    performing an input workload received by the tenant by a dynamically constructed hardware server assembled with the individual ones of the allocated respective members of the pools of hardware resources according to the one of the plurality of SLA classes; wherein the individual ones of the allocated respective members of the pools of hardware resources are used to construct the dynamically constructed hardware server irrespective of whether the individual ones of the allocated respective members of the pool of hardware resources are physically located within a same hardware enclosure notwithstanding at least some of the individual ones of the allocated respective members of the pool of hardware resources are connected to other ones of the allocated respective members of the pool of hardware resources via an optical switch so as to appear as locally connected.

2. The method of claim 1, wherein the plurality of SLA classes comprises a hierarchy of service class levels and includes at least a first class, an economy class, and a standby class.

3. The method of claim 2, wherein:
    the first class service level provides the allocation of the respective members of the pools of hardware resources to the tenant on a real-time basis, such that the requested workload is immediately satisfied;
    the economy class service level provides the allocation of the respective members of the pools of hardware resources to the tenant on a statistical basis, such that the requested workload is satisfied within a first predetermined time period; and
    the standby class service level provides the allocation of the respective members of the pools of hardware resources to the tenant on a guaranteed-minimum basis, such that the requested workload is satisfied within a second predetermined time period.

4. The method of claim 3, further including, upon submitting the requested workload, specifying, by the tenant, a desired service class level of the plurality of service class levels for performing the requested workload.

5. The method of claim 4, further including determining, by a provisioning component, whether to accept and thus perform the requested workload at the desired service class level based upon a current system status.

6. The method of claim 5, further including, responsive to declining to perform the requested workload at the desired service class level, prompting the tenant concerning an alternative service class level for performing the requested workload.

7. A system for agile component-level resource provisioning in a disaggregated cloud computing environment, the system comprising:
    at least one processor device, wherein the at least one processor device:
        allocates respective members of pools of hardware resources within the disaggregated cloud computing environment to a tenant according to one of a plurality of service level agreement (SLA) classes, each respective one of the plurality of SLA classes characterized by a given response time for the allocation of the respective members of the pools of hardware resources corresponding to a requested workload by the tenant; wherein the respective members of the pools of hardware resources include at least processors, memory devices, graphical processing units (GPUs), and accelerators; and allocating the respective members of the pools of hardware resources on the component-level to the tenant comprises allocating, beginning at a minimal unit of allocation, individual portions of individual ones of the processors, the memory devices, the GPUs, and the accelerators to the tenant; and performs an input workload received by the tenant by a dynamically constructed hardware server assembled with the individual ones of the allocated respective members of the pools of hardware resources according to the one of the plurality of SLA classes; wherein the individual ones of the allocated respective members of the pools of hardware resources are used to construct the dynamically constructed hardware server irrespective of whether the individual ones of the allocated respective members of the pool of hardware resources are physically located within a same hardware enclosure notwithstanding at least some of the individual ones of the allocated respective members of the pool of hardware resources are connected to other ones of the allocated respective members of the pool of hardware resources via an optical switch so as to appear as locally connected.

8. The system of claim 7, wherein the plurality of SLA classes comprises a hierarchy of service class levels and includes at least a first class, an economy class, and a standby class.

9. The system of claim 8, wherein:
the first class service level provides the allocation of the respective members of the pools of hardware resources to the tenant on a real-time basis, such that the requested workload is immediately satisfied;
the economy class service level provides the allocation of the respective members of the pools of hardware resources to the tenant on a statistical basis, such that the requested workload is satisfied within a first predetermined time period; and
the standby class service level provides the allocation of the respective members of the pools of hardware resources to the tenant on a guaranteed-minimum basis, such that the requested workload is satisfied within a second predetermined time period.

10. The system of claim 9, wherein the at least one processor device, upon submitting the requested workload, specifies, by the tenant, a desired service class level of the plurality of service class levels for performing the requested workload.

11. The system of claim 10, wherein the at least one processor device determines, by a provisioning component, whether to accept and thus perform the requested workload at the desired service class level based upon a current system status.

12. The system of claim 11, wherein the at least one processor device, responsive to declining to perform the requested workload at the desired service class level, prompts the tenant concerning an alternative service class level for performing the requested workload.

13. A computer program product for agile component-level resource provisioning in a disaggregated cloud computing environment by at least one processor device, the computer program product embodied on a non-transitory computer-readable storage medium having computer-readable program code portions stored therein, the computer-readable program code portions comprising:

an executable portion that allocates respective members of pools of hardware resources within the disaggregated cloud computing environment to a tenant according to one of a plurality of service level agreement (SLA) classes, each respective one of the plurality of SLA classes characterized by a given response time for the allocation of the respective members of the pools of hardware resources corresponding to a requested workload by the tenant; wherein the respective members of the pools of hardware resources include at least processors, memory devices, graphical processing units (GPUs), and accelerators; and allocating the respective members of the pools of hardware resources on the component-level to the tenant comprises allocating, beginning at a minimal unit of allocation, individual portions of individual ones of the processors, the memory devices, the GPUs, and the accelerators to the tenant; and an executable portion that performs an input workload received by the tenant by a dynamically constructed hardware server assembled with the individual ones of the allocated respective members of the pools of hardware resources according to the one of the plurality of SLA classes; wherein the individual ones of the allocated respective members of the pools of hardware resources are used to construct the dynamically constructed hardware server irrespective of whether the individual ones of the allocated respective members of the pool of hardware resources are physically located within a same hardware enclosure notwithstanding at least some of the individual ones of the allocated respective members of the pool of hardware resources are connected to other ones of the allocated respective members of the pool of hardware resources via an optical switch so as to appear as locally connected.

14. The computer program product of claim 13, wherein the plurality of SLA classes comprises a hierarchy of service class levels and includes at least a first class, an economy class, and a standby class.

15. The computer program product of claim 14, wherein:
the first class service level provides the allocation of the respective members of the pools of hardware resources to the tenant on a real-time basis, such that the requested workload is immediately satisfied;
the economy class service level provides the allocation of the respective members of the pools of hardware resources to the tenant on a statistical basis, such that the requested workload is satisfied within a first predetermined time period; and
the standby class service level provides the allocation of the respective members of the pools of hardware resources to the tenant on a guaranteed-minimum basis, such that the requested workload is satisfied within a second predetermined time period.

16. The computer program product of claim 15, further including and executable portion that, upon submitting the requested workload, specifies, by the tenant, a desired service class level of the plurality of service class levels for performing the requested workload.

17. The computer program product of claim 16, further comprising an executable portion that determines, by a provisioning component, whether to accept and thus perform the requested workload at the desired service class level based upon a current system status.

18. The computer program product of claim 17, further comprising an executable portion that, responsive to declining to perform the requested workload at the desired service class level, prompts the tenant concerning an alternative service class level for performing the requested workload.

* * * * *